(12) United States Patent
Grata

(10) Patent No.: US 7,556,468 B2
(45) Date of Patent: Jul. 7, 2009

(54) FOLDING WHEEL RETAINER FOR WHEEL LIFT SYSTEM

(75) Inventor: Fran Grata, Chambersburg, PA (US)

(73) Assignee: Jerr-Dan Corporation, Greencastle, PA (US)

( * ) Notice: Subject to any disclaimer, the term of this patent is extended or adjusted under 35 U.S.C. 154(b) by 557 days.

(21) Appl. No.: 11/283,611

(22) Filed: Nov. 18, 2005

(65) Prior Publication Data

US 2006/0181052 A1    Aug. 17, 2006

Related U.S. Application Data

(60) Provisional application No. 60/628,957, filed on Nov. 19, 2004.

(51) Int. Cl.
*B60P 3/12* (2006.01)
(52) U.S. Cl. ..................................... 414/563
(58) Field of Classification Search ................. 414/563
See application file for complete search history.

(56) References Cited

U.S. PATENT DOCUMENTS

| 4,564,207 | A | 1/1986 | Russ et al. |
| 4,678,392 | A | 7/1987 | Capers et al. |
| 5,326,216 | A | 7/1994 | Russ |
| 5,350,271 | A | 9/1994 | Weller |
| 5,722,810 | A | 3/1998 | Young et al. |
| 5,782,303 | A * | 7/1998 | Christian .................. 166/311 |
| 6,139,250 | A | 10/2000 | Nolasco |
| 6,315,515 | B1 | 11/2001 | Young et al. |
| 2004/0105746 | A1 | 6/2004 | Nolasco |

OTHER PUBLICATIONS

International Search Report and Written Opinion for Application No. PCT/US2005/042031, Date of Mailing Mar. 16, 2006, 9 pages.

* cited by examiner

*Primary Examiner*—Charles A Fox
(74) *Attorney, Agent, or Firm*—Foley & Lardner LLP

(57) ABSTRACT

A wheel lift system for use with a transporter vehicle is provided. The wheel lift system comprises a boom assembly, a cross bar supported at a distal end of the boom assembly, a first arm supported at the cross bar and configured to move between a stowed position and a use position, and a second arm movably coupled to the first arm and configured to move between a stowed position and a use position. A cam is provided for moving the second arm from the use position to the stowed position. The wheel lift system may optionally include an unfolding mechanism for moving the second arm from the stowed position to the use position.

26 Claims, 10 Drawing Sheets

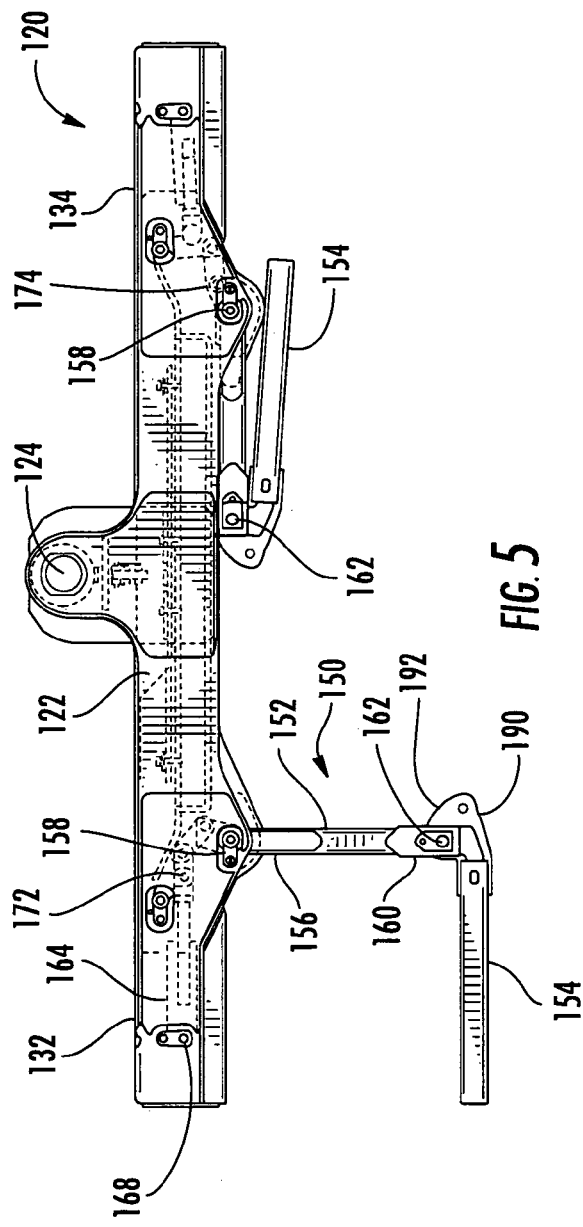
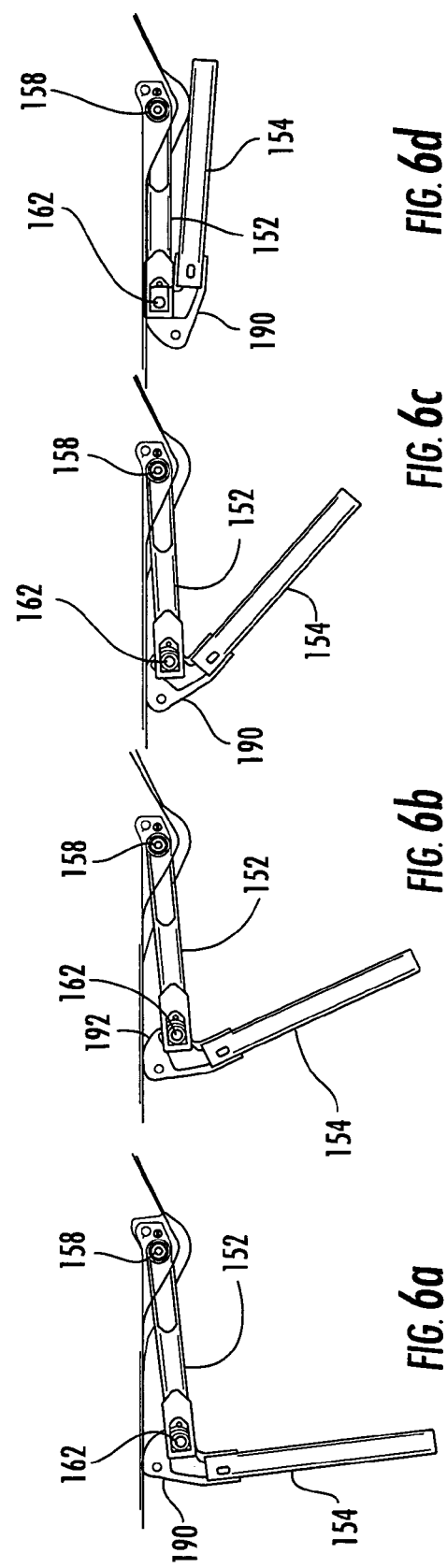
FIG. 5
FIG. 6a  FIG. 6b  FIG. 6c  FIG. 6d

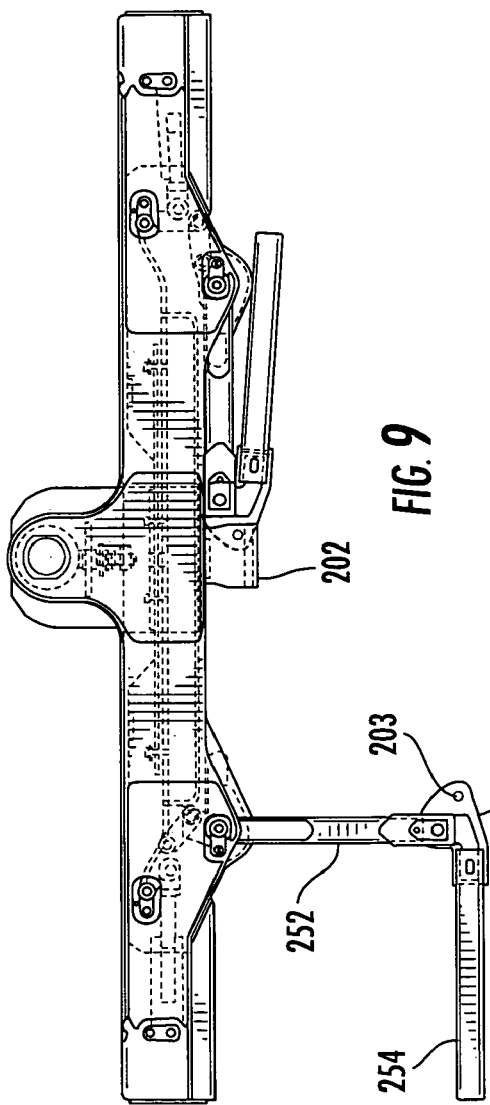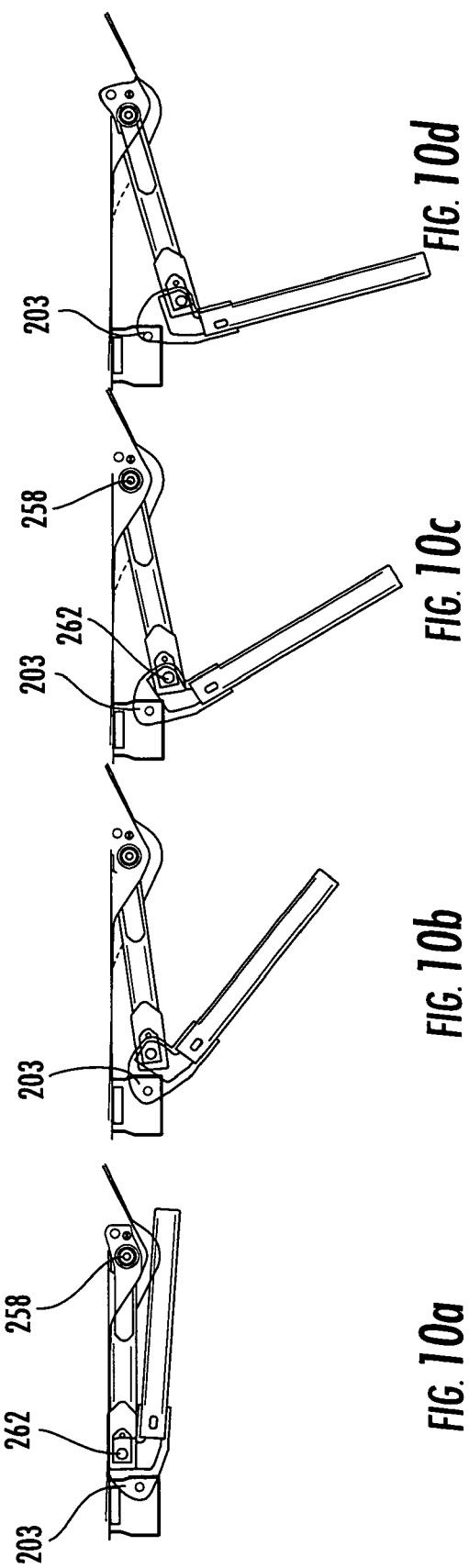

FOLDING WHEEL RETAINER FOR WHEEL LIFT SYSTEM

CROSS-REFERENCE TO RELATED PATENT APPLICATIONS

This application claims the benefit under 35 U.S.C. 119(e) of U.S. Provisional Application No. 60/628,957, having a filing date of Nov. 19, 2004, titled "L-ARM FOLDING DEVICE FOR VEHICLE UNDERLIFT," the disclosure of which is hereby incorporated by reference in its entirety.

BACKGROUND

The present invention relates generally to the field of vehicle lifting and towing equipment. More specifically, the present invention relates to systems for lifting and supporting one or more wheels of a vehicle to be towed.

Systems configured to lift and tow a vehicle by lifting either the front or rear wheels off the ground and towing the partially-lifted vehicle on its remaining two wheels are generally referred to as wheel lift or underlift systems. Wheel lift systems generally employ an extensible and/or folding crane or boom assembly supported at a rear portion of a transporter truck (e.g., wrecker, roll-back truck, tow truck, carrier, etc.) and extending rearwardly from or out beyond the truck's rear deck (the space between the rear of the cab and the rear bumper). The boom assembly represents the main lifting or leverage component for lifting one end of the vehicle to be towed. Provided at a distal end of the boom assembly is a cross bar member. A wheel engaging apparatus, hereinafter referred to as a wheel retainer system, for lifting and/or supporting the front or rear wheels of a vehicle is coupled to the cross bar member. When positioning the wheel lift system for towing, the boom assembly is maneuvered into a position such that the cross bar member is positioned against the tread of the tires and the wheel retainer system secures the tires in place against the cross bar member.

Often, the wheel retainer system is in the form of a pair of L-shaped members or arms (one for engaging each wheel of the vehicle to be towed) coupled to the cross bar member and extending rearwardly therefrom. The L-shaped members are often fixedly coupled to the cross bar member with a first segment of the "L" fixed relative to the second segment of the "L." In certain applications, it may be desirable to reduce the amount of space that is occupied by the L-shaped members when not being used (e.g., when the transporter vehicle is traveling without a vehicle in tow, etc.). When a wheel lift system is used with a wrecker truck, wherein the boom assembly can be rotated upwards to a substantially vertical position when stowed, the L-arms can be permanently coupled to the cross bar and outwardly extend therefrom. However, when a wheel lift system is used with a carrier or roll-back type truck, the boom assembly cannot be rotated upwards to a substantially vertical position because of the presence of the carrier deck. In such applications, the wheel retainer systems may need to be manually removed and/or moved to reduce the safety hazard caused by having the wheel retainer systems outwardly extend from the rear of the transporter vehicle.

Accordingly, there is a need for a wheel lift system having a foldable or otherwise collapsible wheel retainer system. There is also a need for a wheel lift system having a wheel retainer system that is configured to be selectively moved from a use position (wherein the wheel retainer system outwardly extends from a cross bar member) and a stowed position (wherein the wheel retainer system is collapsed against the cross bar member). There is also a need for a wheel lift system having a wheel retainer system that can be moved between the use position and the stowed position without requiring manual manipulation on the part of an operator. There is also a need for a wheel lift system having a wheel retainer system that can be actuated into the use position without requiring manual manipulation on the part of an operator.

It would be desirable to provide a wheel lift system that provides one or more of these or other advantageous features as may be apparent to those reviewing this disclosure. The teachings disclosed extend to those embodiments which fall within the scope of the appended claims, regardless of whether they accomplish one or more of the above-mentioned needs.

SUMMARY

An exemplary embodiment of the present invention relates to a wheel grid. The wheel grid includes a cross bar, a first arm supported at the cross bar and configured to move between a stowed position and a use position, a second arm movably coupled to the first arm and configured to move between a stowed position and a use position, and a cam supported at the second arm and configured to move the second arm from the use position to the stowed position.

Another exemplary embodiment of the present invention relates to an wheel lift system for use with a transporter vehicle. The wheel lift system includes a boom assembly, a cross bar supported at a distal end of the boom assembly, a first arm movably coupled to the cross bar and configured to move between a retracted stowed position and an extended use position, a second arm pivotally coupled to the first arm and configured to move between a retracted stowed position and an extended use position, and a cam supported at the second arm and configured to engage the cross bar for moving the second arm from the use position to the stowed position.

Another exemplary embodiment of the present invention relates to a transporter vehicle. The transporter vehicle includes a movable chassis, an extensible boom assembly supported at a rear portion of the chassis, a cross bar supported at a distal end of the extensible boom assembly, a first arm pivotally coupled to the cross bar and configured to move between a stowed position and a use position, a second arm pivotally coupled to the first arm and configured to move between a stowed position and a use position, a powered actuator configured to move the first arm between the stowed position to the use position, and an unfolding mechanism configured to move the second arm from the stowed position to the use position in response to the powered actuator moving the first arm.

BRIEF DESCRIPTION OF THE DRAWINGS

FIG. 5 is a top view of a wheel grid of the wheel lift system shown in FIG. 1.

FIGS. 6a through 6d are top views of the wheel grid shown in FIG. 5 showing a wheel retainer system moving sequentially from an intermediate position to a stowed position.

FIG. 9 is a top view of the wheel grid shown in FIG. 7.

FIG. 10a through 10d are top views of the wheel grid shown in FIG. 7 showing a Wheel retainer system moving sequentially from a stowed position to an intermediate position.

DETAILED DESCRIPTION

Figure 1:
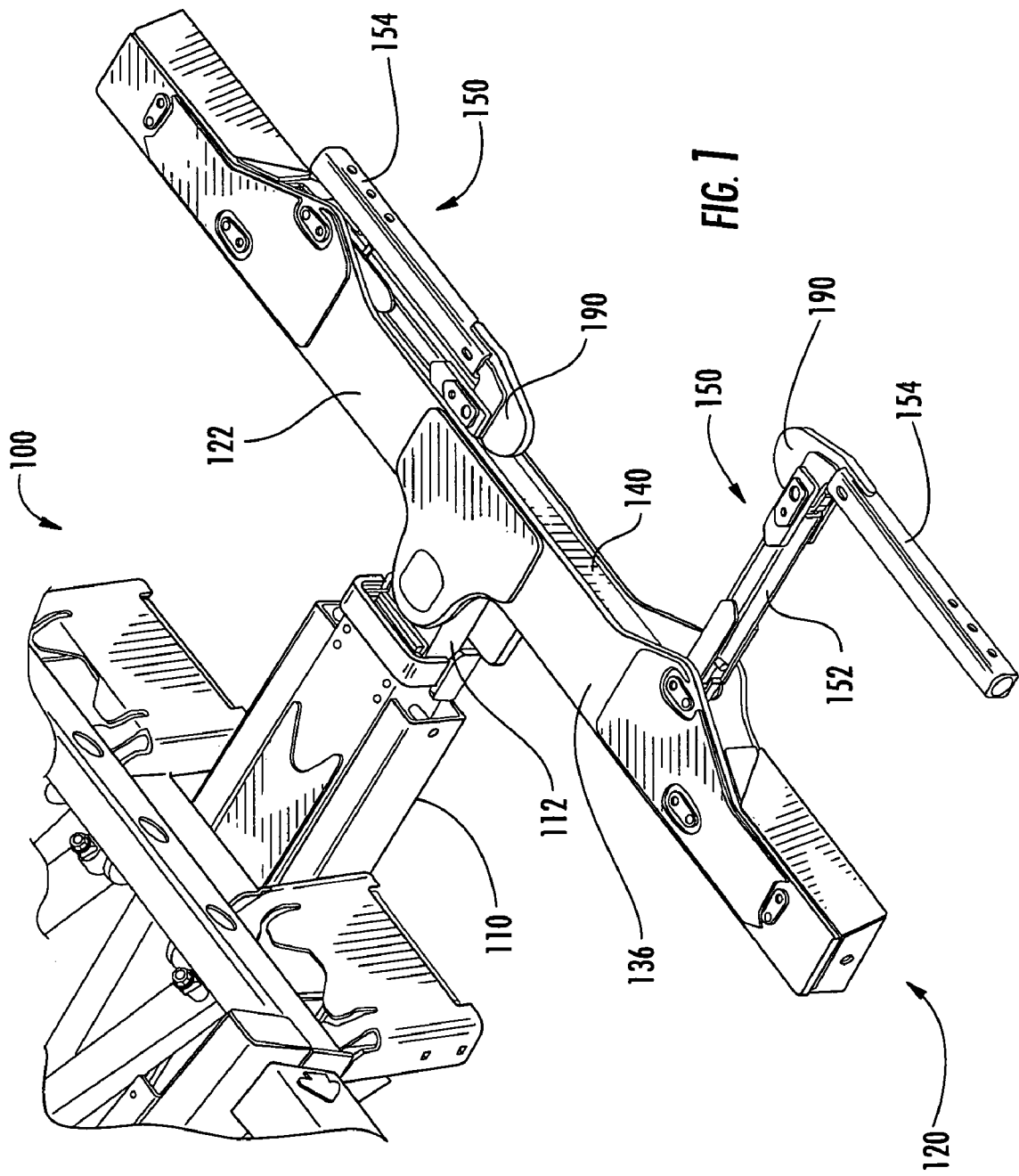
FIG. 1 is a perspective view of wheel lift system according to an exemplary embodiment.

Referring to FIG. 1, a wheel lift system 100 (e.g., underlift system, etc.) is shown according to an exemplary embodiment. The wheel lift system 100 is capable of lifting and supporting either the front or rear wheels of a vehicle to be towed off the ground so that the partially lifted vehicle can be towed or otherwise transported on its remaining wheels. The wheel lift system 100 generally comprises a boom assembly 110, a wheel grid 120 comprising a cross bar member 122 (e.g., wheel boom, cross beam, etc.) coupled to a distal end 112 of the boom assembly 110 and one or more wheel retainer systems 150 coupled to the cross bar member 122. The wheel retainer systems 150 are configured to be selectively moved between a first position (e.g.; an extended position, wheel engaging position, etc.), referred to generally herein as a use position, and a second position (e.g., a retracted stowed position, collapsed position, folded position, etc.), referred to generally herein as a stowed position.

Generally, each wheel retainer system 150 comprises a first member 152 (e.g., an extension or linking arm, etc.) that is configured to be movably coupled to the wheel boom and a second member 154 (e.g., a wheel engaging or capturing arm, etc.) that is configured to be movably coupled to the first member 152. The wheel retainer system 150 further comprises a structure, shown as a cam 190, which enables the second member 154 of the wheel retainer system 150 to achieve the stowed position without requiring manual manipulation on the part of an operator.

According to one nonexclusive exemplary embodiment, the cam 190 is supported at the second member 154 and configured to engage or otherwise contact (directly or indirectly) the cross bar member 122 as the wheel retainer system 150 is moving from the use position to the stowed position. In such an exemplary embodiment, the first member 152 and the second member 154 may cooperate to form a substantially L-shaped wheel retainer when in the use position with the second member 154 being orientated at a position that is substantially 90 degrees from the first member 152. Preferably, a pair of wheel retainer systems 150 are provided (one for engaging and supporting each front or rear wheel of the vehicle to be transported).

The wheel lift system 100 advantageously provides a wheel retainer system that can be efficiently moved to a stowed position without requiring manual manipulation on the part of the operator. Such a feature may save valuable time for the operator and/or may reduce safety hazards that may otherwise exist if the wheel retainer systems remain in a use position when a vehicle is not in tow.

Figure 4:
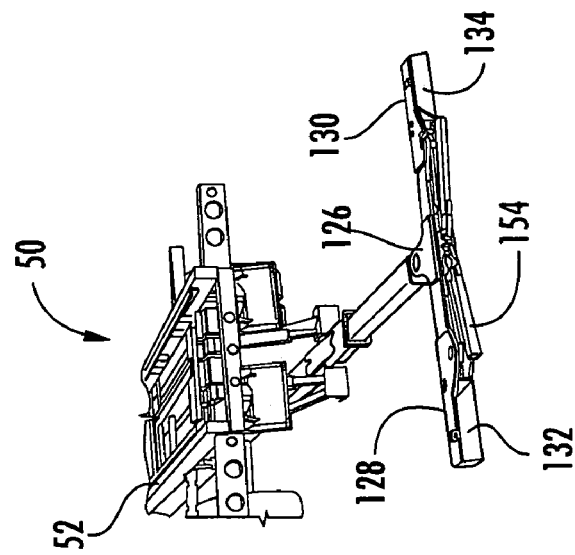
FIG. 4 is a rear perspective view of the transporter vehicle having the wheel lift system shown in FIG. 1 and showing wheel retainer systems in a stowed position.
Figure 3:
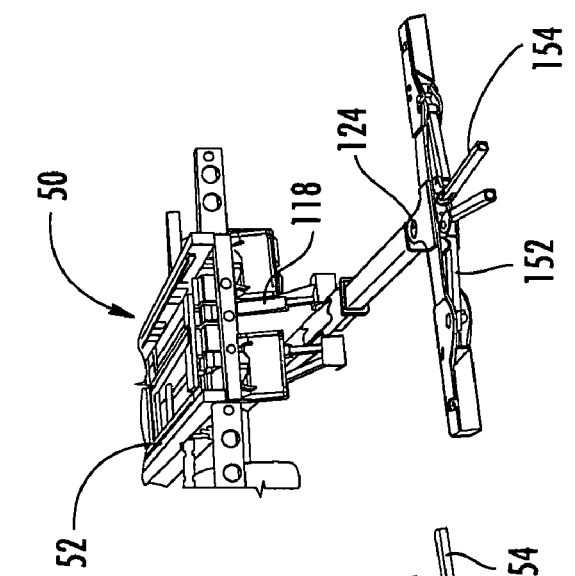
FIG. 3 is a rear perspective view of the transporter vehicle having the wheel lift system shown in FIG. 1 and showing wheel retainer systems in an intermediate position.
Figure 2:
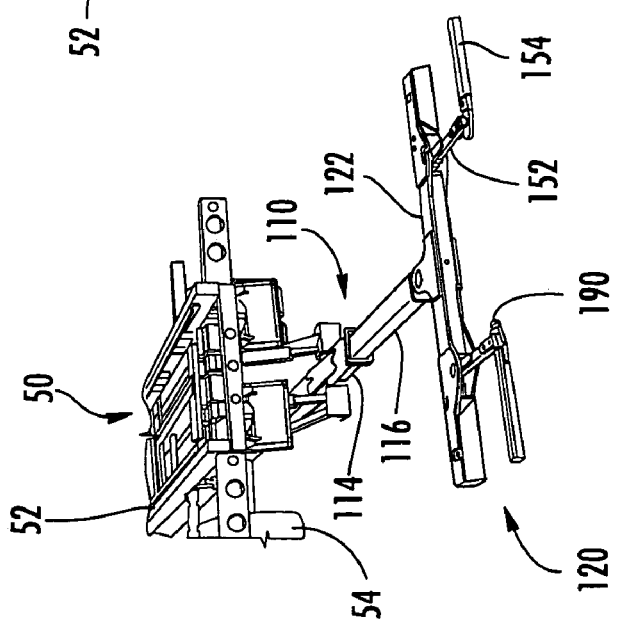
FIG. 2 is a rear perspective view of a transporter vehicle having the wheel lift system shown in FIG. 1 and showing wheel retainer systems in a use position.

FIGS. 2 through 4 show the wheel lift system 100 in conjunction with a transporter vehicle (e.g., wrecker, roll-back truck, tow truck, etc.), shown as a carrier 50. The carrier 50 is a roll-back type vehicle that generally includes a chassis 52 (e.g., a truck bed frame, etc.) functioning as a support structure for the components of the carrier 50 and is typically in the form of a frame assembly. According to an exemplary embodiment, the chassis includes first and second frame members that are arranged as two generally parallel chassis rails extending in a fore and aft direction. The first and second frame members are configured as elongated structural or supportive members (e.g., a beam, channel, tubing, extrusion, etc.) spaced apart laterally and defining a void or cavity (not show) which generally constitutes the centerline of the carrier 50.

A plurality of drive wheels 54 are rotatably coupled to the chassis 52. The number and/or configuration of the wheels 54 may vary depending on the embodiment. According to an exemplary embodiment, the carrier 50 utilizes six wheels 54 (a tandem wheel set at a rear portion of the chassis and a single wheel set at a front portion of the chassis). According to various alternative embodiments, the carrier 50 may have any number of wheel configurations including, but not limited to, four, eight, or twelve wheels.

The carrier 50 is further includes an occupant compartment or cab (not shown) supported at a front end of the chassis 52 which includes an enclosure or area capable of receiving a human operator or driver. The cab includes controls associated with the manipulation of the carrier 50 (e.g., steering controls, throttle controls, etc.) and optionally may include controls for manipulating the wheel lift system 100 provided at the rear portion of the chassis. The rear portion of the chassis 52 is further configured to movably support a deck assembly (also not shown) upon which a load (e.g., a disabled vehicle, etc.) may be supported. One or more powered actuator devices (e.g., hydraulic cylinders, screw actuators, etc.) may be provided for moving the deck assembly between a stowed or transport position and a tilted loading position.

It should be understood that, although the systems for lifting, supporting, and/or cradling a wheel of a vehicle to be transported (e.g., the wheel lift system 100, the wheel grid 120; the wheel retainer system 150, etc.) is described herein with reference to the carrier 50, one or more of the systems for lifting, supporting, and/or cradling a wheel of a vehicle to be transported disclosed herein may be applied to, and find utility in, other types of transporter vehicles as well. For example, one or more of the systems for lifting, supporting, and/or cradling a wheel of a vehicle to be transported may be suitable for use with wreckers, tow trucks, recovery vehicles, or any other transporter vehicle wherein it would be desirable to tow a vehicle.

Referring further to FIGS. 2 through 4, the wheel retainer systems 150 of the wheel lift system 100 are shown in a number of different positions. FIG. 2 shows the wheel retainer systems 150 in the use position. The use position may also be referred to as a closed or deployed position, and is generally the position which would be used when transporting a vehicle. In the use position, each wheel retainer system 150 engages (e.g., captures, etc.) or is at least partially disposed about a wheel of the vehicle to be transported. FIG. 4 shows the wheel retainer systems 150 in the stowed position. The stowed position may also be referred to as the retracted or collapsed position, and is generally the position used when not transporting a vehicle. In the stowed position, the wheel retainer systems 150 are folded or otherwise collapsed toward the cross bar member 122 to reduce the overall size of the wheel retainers. When the wheel lift system 100 is stowed, the boom assembly 110 would generally be retracted and lifted off the ground from the position illustrated. FIG. 3 shows the wheel retainer systems 150 in a third position. The third position may be referred to as an intermediate or open position, and is generally the position wherein the wheels of the vehicle to be towed are about to be engaged or have just been disengaged (depending on whether the vehicle is being loaded or unloaded).

Referring further to FIGS. 2 through 4, the boom assembly 110 is shown in an extended and lowered position and as being supported at the rear portion the carrier 50. The boom assembly 110 generally includes a first or base boom section 114, one or more extensible boom sections (shown as a second boom section 116), one or more first actuator devices 118 for lifting and/or adjusting the angle or tilt of the base boom section 114 relative to the chassis, and one or more second actuator devices (not shown) for extending and retracting the one or more extensible boom sections relative to the base boom section 114.

According to the embodiment illustrated, the boom assembly 110 is a two-stage boom assembly, wherein the second boom section 116 is telescopically extendable from the outer end of the base boom section 114. According to various alternative embodiments, the boom assembly 110 may not have an extensible boom section, or alternatively, may have more than one (e.g., a three-stage boom, etc.). Further, any such extensible boom section may movable relative to the base boom section in ways other than a telescopic relationship. The actuators used to selectively position the boom assembly 110 (e.g., the first or second actuators, etc.) may be hydraulic actuators, screw actuators driven by a screw motor, pneumatic actuators, or any other suitable device for providing movement.

Provided at the distal end 112 of the boom assembly 110 is the cross bar member 122. The cross bar member 122 and the wheel retainer systems 150 cooperate to form the wheel grid 120 for cradling the wheels of the vehicle to be transported. The cross bar member 122 is shown as being rotatably coupled to the distal end 112 of the boom assembly 110 by a pivot shaft or rod (e.g., bearing, etc.), shown as a cylindrical member 124. The cylindrical member 124 extends through the distal end 112 of the boom assembly 110 and engages a mounting structure on the cross bar member 122. The mounting structure is shown as including a first or upper support plate 126 and a second or lower support plate 128 which extend outwardly from cross bar member 122 toward the distal end 112 of the boom assembly 110.

The cross bar member 122 is shown a being substantially perpendicular to the boom assembly 110. According to the embodiment illustrated, the cross bar member 122 is configured to pivot about the cylindrical member 124 for movement through substantially 180 degrees. Such movement allows to wheel lift system 100 to engage the wheels of a vehicle without requiring the carrier 50 to be directly in front or in-line with the vehicle to be transported. According to various alternative embodiments, the cross bar member 122 may be fixedly coupled relative to a boom assembly or may be configured for movement through less than or greater than 180 degrees.

The cross bar member 122 is shown as being a substantially rectangular member which includes first and second wheel abutments 128, 130 having respective wheel engaging surfaces 132, 134. The cross bar member 122 is preferably a at least partially hollowed structure defined by a top surface 136, a bottom surface 138 parallel to the top surface 136 and two parallel surfaces 140 and 142. As detailed below, the cross bar member 122 conceals or otherwise houses one or more components used to move the wheel retainer systems 150. According to various alternative embodiments, the wheel retainer systems 150 may be used in conjunction with any of a number of cross bars and is not limited to use with the cross bar member 122.

Referring to FIGS. 5 through 6d, the wheel grid 120 is shown according to a first exemplary embodiment. In such an exemplary embodiment, the wheel retainer system 150 is configured to move from the use position to the stowed position without requiring manual manipulation on the part of the operator. However, in such an embodiment, the wheel retainer system 150 requires the assistance of the operator when moving from stowed position to the intermediate and/or use positions.

Referring particularly to FIG. 5, the wheel retainer system 150 provided at a left portion of the cross bar member 122 is shown in the use position, while the wheel retainer system 150 provided at a right portion of the cross bar member 122 is shown in the stowed position. The selective positioning of the two wheel retainer systems 150 between the use stowed position and the use position may be operated independently of each other, or alternatively may be operated such that the movement of one coincides with the movement of the other.

Each wheel retainer system 150 generally comprises a first arm (e.g., an extension or linking arm, etc.), shown as the first member 152 and a second arm (e.g., engaging or capturing arm, etc.), shown as a second member 154. In the use position, the second member 154 is offset from the corresponding wheel abutment 132 or 134 and configured to be positioned at least partially behind the wheel of the vehicle to be transported. The first member 152 is provided between the cross bar member 122 and the second member 154 for supporting the second member 154 at a position longitudinally offset from the corresponding wheel abutment 132 or 134.

The first member 152 is shown as a substantially rectangular member having a first end 156 configured to be pivotally coupled to the cross bar member 122 about a first axis 158 and a second end 160 configured to be pivotally coupled to the second member 154 about a second axis 162. In the use position, the first member 152 outwardly extends from the cross bar member 122 in a direction that is substantially perpendicular to the cross bar member 122. The first member 152 can be selectively moved to the stowed wherein the first member 152 is substantially parallel with the cross bar member 122.

The first member 152 is selectively moved between the use position and the stowed position using one or more actuator devices 164. For example, as illustrated in FIG. 5, the actuator devices 164 comprise a pair of hydraulic cylinders (one for controlling the movement of each wheel retainer system 150). It should be noted that the actuator devices 164 are not limited to a hydraulic actuator devices and can be any other type of actuator capable of producing mechanical energy for exerting forces suitable to move the first member 152. For example, the actuator devices 164 can be pneumatic, electrical, and/or any other suitable actuator devices.

The actuator devices 164 are preferably concealed within the cross bar member 122. Each actuator device 164 has a first end 166 pivotally coupled to the cross bar member 122 about a pivot shaft 168 and a second end 170 pivotally coupled to the first end 156 of the first member 152 about a pivot shaft 172. According to an exemplary embodiment, a linkage configuration or apparatus 174 may be provided between the second end 170 of the actuator device 164 and the first end 156 of the first member 152. For example, the linkage apparatus 174 may be similar to the over-center locking mechanism disclosed in U.S. Pat. No. 5,722,810 to Young et al., entitled "Over-Center Locking Mechanism for Tow Truck Wheel-Lift or the Like" and in U.S. Pat. No. 6,315,515 to Young et al., entitled "Over-Center Locking Mechanism for Tow Truck Wheel-Lift or the Like," the disclosures of which are hereby incorporated be reference in their entirety. Such a linkage apparatus may allow the first member 152 to be locked in the use and/or stowed position without aid of force from the actuator device 164. According to the embodiment illustrated, the linkage apparatus 174 is pivotally coupled to the first end 156 of the first member 152 about a pivot shaft 176.

According to an exemplary embodiment, the first member 152 is a tubular member formed of a suitable material (e.g., metal, bi-metals, plastic, composites, etc.). According to various alternative embodiments, the first member 152 may have any of a variety of suitable shapes other than a substantially rectangular member.

Referring further to FIG. 5, the second member 154 is shown as a substantially rectangular member having a first end 178 configured to be pivotally coupled to the first member 152 about the second axis 162 and a second end 180 opposite the first end 178. In the use position, the second member 154 outwardly extends from the first member 152 in a direction that is substantially perpendicular to the first member 152 and substantially parallel with the cross bar member 122. In the stowed position, the second member 154 is substantially parallel with the first member 152 and the cross bar member 122. To allow the second member 154 to achieve the stowed position without requiring manual manipulation on the part of the operator, the cam 190 is provided.

According to an exemplary embodiment, the cam 190 is supported at the first end 178 of second member 154. The cam 190 generally comprises a camming surface 192 configured to engage or otherwise contact (directly or indirectly) the cross bar member 122 as the first member 152 is moved from the use position to the stowed position by the actuator device 164. The camming surface 192 is shaped so that when the cam 190 engages the cross bar member 122 the second member 154 begins to fold or otherwise collapse inward toward the first member 152 and continues to fold or otherwise collapse inward until the second member 154 is in the stowed position (e.g., a position wherein the second member 154 is substantially parallel with the first member 152, etc.). According to the embodiment illustrated, the camming surface 192 has a curvilinear shape to provide for such movement.

According to a preferred embodiment, the cam 190 is fixedly coupled to the first end 178 of the second member 154 and pivotally coupled to the second end 160 of the first member 152 about the second axis 162. According to various alternative embodiments, the cam 190 may be integrally formed with the second member 154 and provided as a unitary one-piece member.

The movement and/or operation of the wheel retainer system 150 will be described with reference to FIGS. 6a through 6d, which show the wheel retainer system 150 moving from the intermediate position (shown in FIG. 6a) toward the stowed position (shown in FIG. 6d). In FIG. 6a, the wheel retainer system 150 has already moved from the use position to the intermediate position. To reach this position, the operator selectively actuated the actuator device 164 to rotate the first member 152 about the first axis 158. As the actuator device 164 continues to rotate the first member 152 about the first axis 158, the camming surface 192 of cam 190 will in turn engage the cross bar member 122. Once the camming surface 192 contacts the cross bar member 122, and the actuator device 164 continues to rotate the first member 152, the second member 154 will begin to fold or otherwise collapse inward toward the first member 152 as shown in FIGS. 6b and 6c until the stowed position (as shown in FIG. 6d) is achieved.

To move the wheel retainer system 150 from the stowed position to the use position, the operator selectively actuates the actuator device 164 which causes the first member 152 to rotate outward away from the cross bar member 122 about the first axis 158. The actuator device 164 rotates the first member 152 until the first member 152 is substantially perpendicular to the cross bar member 122. In order to achieve the full use position, the operator must physically rotate the second member 154 about the second axis 162 into the position wherein the second member 154 is substantially perpendicular to the first member 152 and substantially parallel with the cross bar member 122. Preferably, the second member 154 cannot be rotated beyond this position to ensure that the wheel retainer system 150 remains engaged with the wheel of the vehicle to be transported. According to various embodiments, a detent or other locking device may be provided to maintain the second member 154 in a desired position relative to the first member 152 until the wheel retainer system 150 is sought to be moved to the stowed position.

Referring to FIGS. 7 through 10, a second embodiment of a wheel grid system (shown as a wheel grid 220) is shown. For brevity, the description of the wheel grid 220 will be generally limited to its differences relative to the wheel grid 120 described above. For convenience, substantially similar elements will be identified by the same reference numerals but preceded by a "2" instead of a "1."

Similar to the wheel grid 120 described above, the wheel retainer systems 250 of the wheel grid 220 are configured to move from the use position to the stowed position without requiring manual manipulation on the part of the operator (e.g., the cam 290 urges the second member 254 into a position wherein the second member 254 is substantially parallel with the first member 252 and the cross bar member 222, etc.). The wheel grid 220 differs from the wheel grid 120 in that the wheel retainer systems 250 are also configured to move from stowed position to the intermediate and/or use positions without requiring manual manipulation on the part of the operator.

Figure 7:
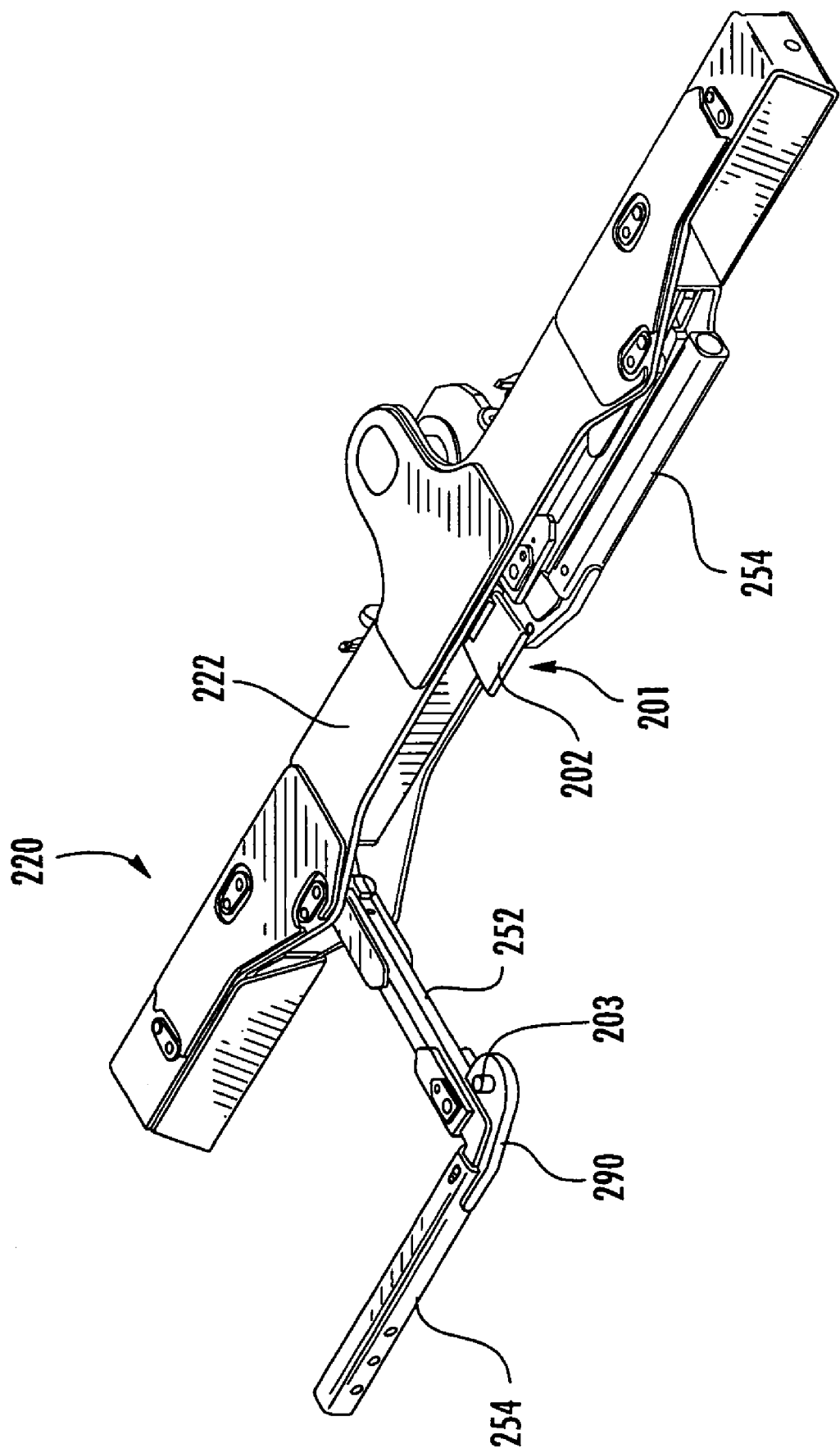
FIG. 7 is a perspective view of a wheel grid according to another exemplary embodiment.

Referring in particular to FIG. 7, the wheel grid 220 includes an unfolding mechanism 201 for moving the second member 254 into the use position as the actuator device 264 moves the first member 252 from the stowed position to the use position. The unfolding mechanism 201 generally comprises a latch 202 and a projection (e.g., protrusion, tab, etc.), shown as a substantially cylindrical pin 203. The latch 202 is supported at the cross bar member 222, while the pin 203 is supported at the second member 154. The pin 203 (which functions as a cam follower) is configured to engage the latch 202 (which functions as a cam) to rotate the second member 254 relative to the first member 252.

The pin 203 is shown as upwardly extending from the cam 290. The pin 203 may be coupled to the cam 290, or alternatively, may be integrally formed with the cam 290. According to various alternative embodiments, the pin 203 may be coupled and/or integrally formed with other components of the wheel grid 220 (e.g., second member 254, etc.). According to other alternative embodiments, the pin 203 may be replaced with any structure suitable for following the camming surface of the latch 202.

Figure 8:
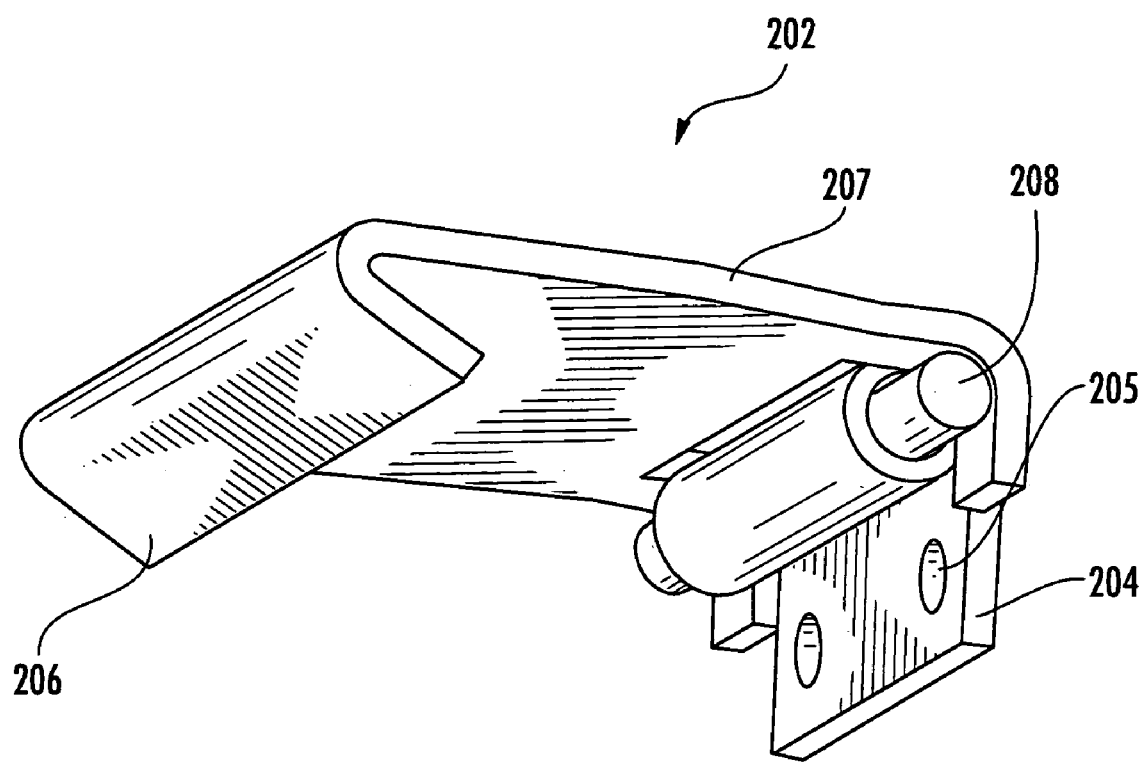
FIG. 8 is a perspective view of a component of the wheel grid shown in FIG. 7.

According to the embodiment illustrated, a common latch 202 is provided for deploying the second members 254 of each wheel retainer system 250. According to various alternative embodiments, separate latches may be provided. FIG. 8 shows the latch 202 according to an exemplary embodiment. As shown, the latch 202 comprises a mounting structure 204 for fixedly coupling the latch 202 to the cross bar member 222. The mounting structure 204 includes one or more holes 205 configured to receive a mechanical fastener (e.g., a bolt, locking pin, rivet, etc.) used to secure the latch 202 to the cross bar member 222. According to various alternative embodiments, the latch 202 may be coupled to the cross bar member 222 using any other suitable coupling technique (e.g., a welding operation, etc.), or may be integrally formed with the cross bar member 222.

The latch 202 further comprises a flange or lip 206 configured to guide the pin 203 as the first member 252 moves from the stowed position to the use position. The lip 206 is shown as downwardly extending from a body portion 207 at a distal end of the body portion 207. The body portion 207 is shown as being pivotally coupled relative to the mounting structure 204 about a pivot shaft 208. The pivot shaft 208 allows the lip 206 and body portion 207 to swing upwardly when engaged by the pin 203 as the wheel retainer system 230 is moving from the use position to the stowed position.

FIGS. 10a through 10d sequentially illustrate the operation of the unfolding device 201. In FIG. 10a the wheel retainer system 250 is shown in the stowed position. To deploy the wheel retainer system 250, the actuator device 264 applies a force on the first member 252 which causes the first member 252 to rotate counterclockwise about the first axis 258. When the pin 203 supported at the second member 254 contacts the lip 206 of the latch 202, the second member 254 begins to rotate clockwise about the second axis 262. As long as the rotation of the first member 252 continues, the engagement of the pin 203 with the lip 206 will cause the second member 254 to rotate. Once the pin 203 reaches the lateral edge of the lip 206, the second member 254 is substantially perpendicular to the first member 252. A detent or other locking device may be provided to maintain the second member 254 in a desired use position relative to the first member 252.

Referring to FIGS. 11 through 14, a third embodiment of a wheel grid system (shown as a wheel grid 320) is shown. For brevity, the description of the wheel grid 320 will be generally limited to its differences relative to the wheel grid 120 described above. For convenience, substantially similar elements will be identified by the same reference numerals but preceded by a "3" instead of a "1."

Similar to the wheel grid 120 and the wheel grid 220 described above, the wheel retainer systems 350 of the wheel grid 320 are configured to move from the use position to the stowed position without requiring manual manipulation on the part of the operator (e.g., the cam 390 urges the second member 354 into a position wherein the second member 354 is substantially parallel with the first member 352 and the cross bar member 322, etc.). The wheel grid 320 differs from the wheel grid 120 in that the wheel retainer systems 350 are also configured to move from stowed position to the intermediate and/or use positions without requiring manual manipulation on the part of the operator. The wheel grid 320 differs from the wheel grid 220 in the mechanism used to move the wheel retainer systems 350 from stowed position to the intermediate and/or use positions.

Figure 11:
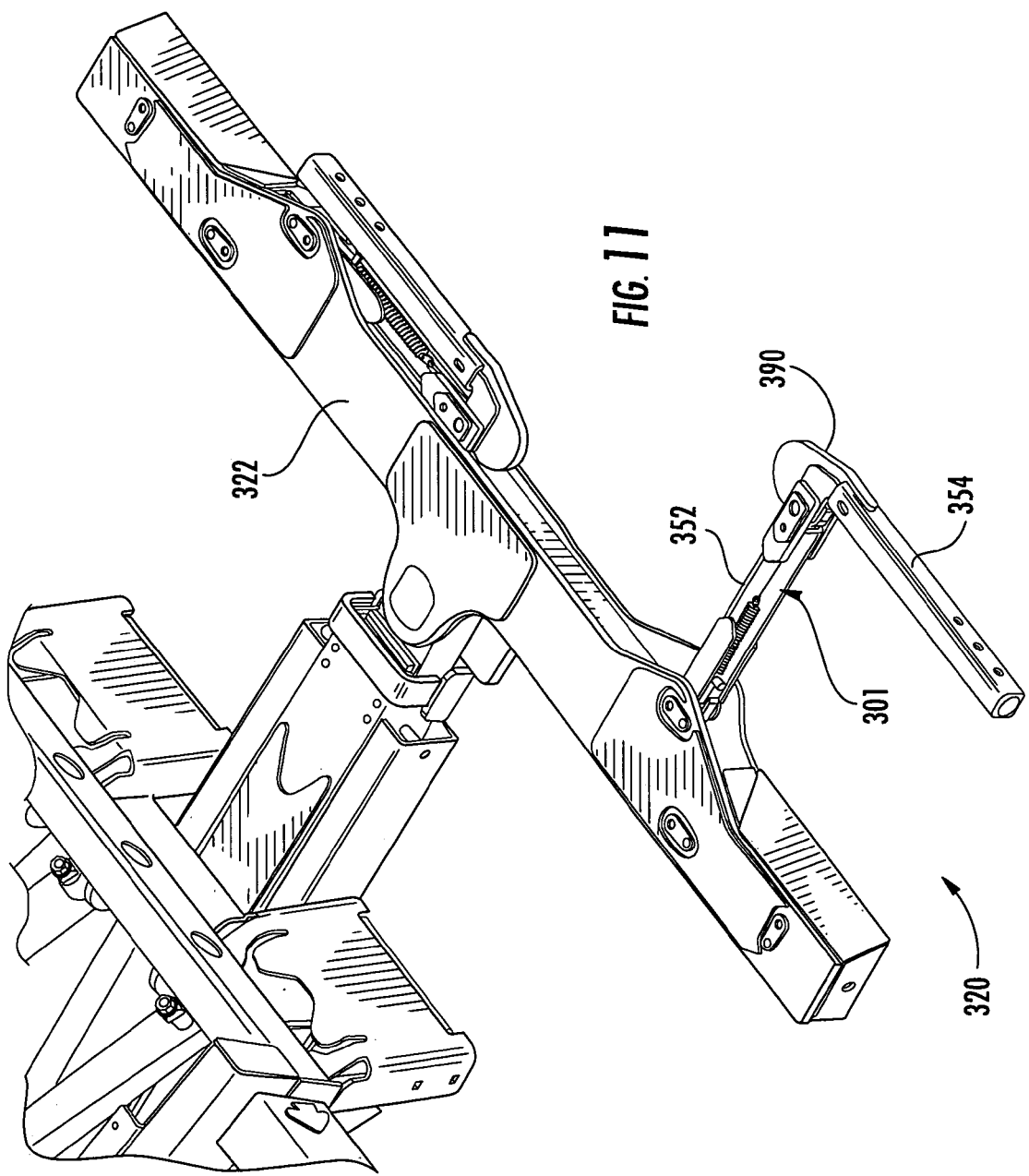
FIG. 11 is a perspective view of a wheel lift system shown according to another exemplary embodiment.
Figure 12:
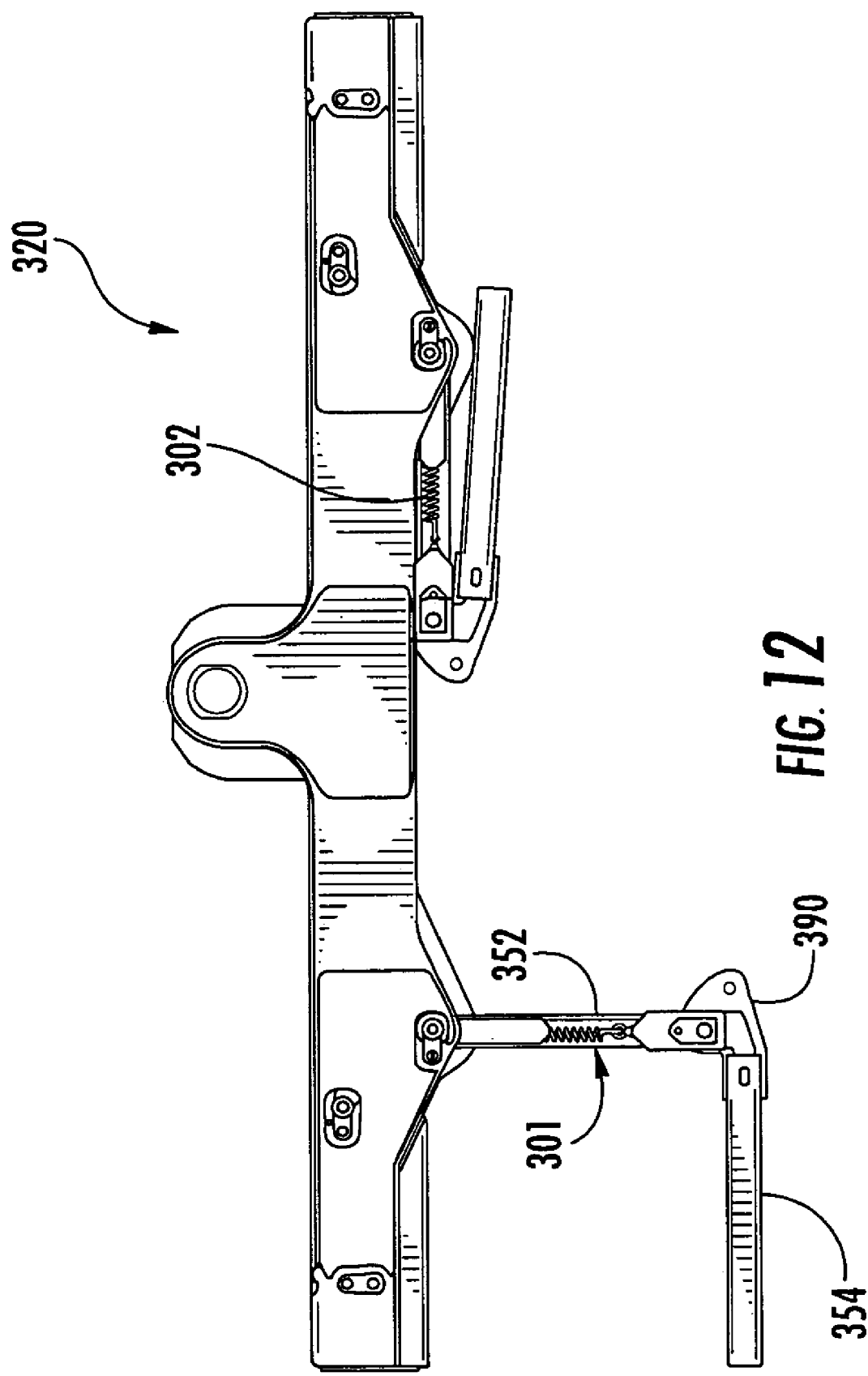
FIG. 12 is a top view of a wheel grid of the wheel lift system shown in FIG. 11.

Referring in particular to FIGS. 11 and 12, the wheel grid 320 includes an unfolding mechanism 301 for moving the second member 354 into the use position as the actuator device 364 moves the first member 352 from the stowed position to the use position. The unfolding mechanism 301 generally comprises a biasing element (e.g., resilient member, torsion, compression, tension spring, etc.), shown as a helical spring 302 configured to urge the second member 354 into the use position as the actuator device 364 moves the first member 352.

The spring 302 is at least partially concealed within the first member 352 and includes a first end 303 coupled to first member 352 and a second end 304 coupled to the second member 354. The spring 302 is loaded (e.g., tensioned, etc.) when the second member 354 is folded inward toward the first member 352 and is at least partially unloaded (e.g., released, relaxed, etc.) when the second member 354 is substantially perpendicular to the first member 352.

Figure 13:
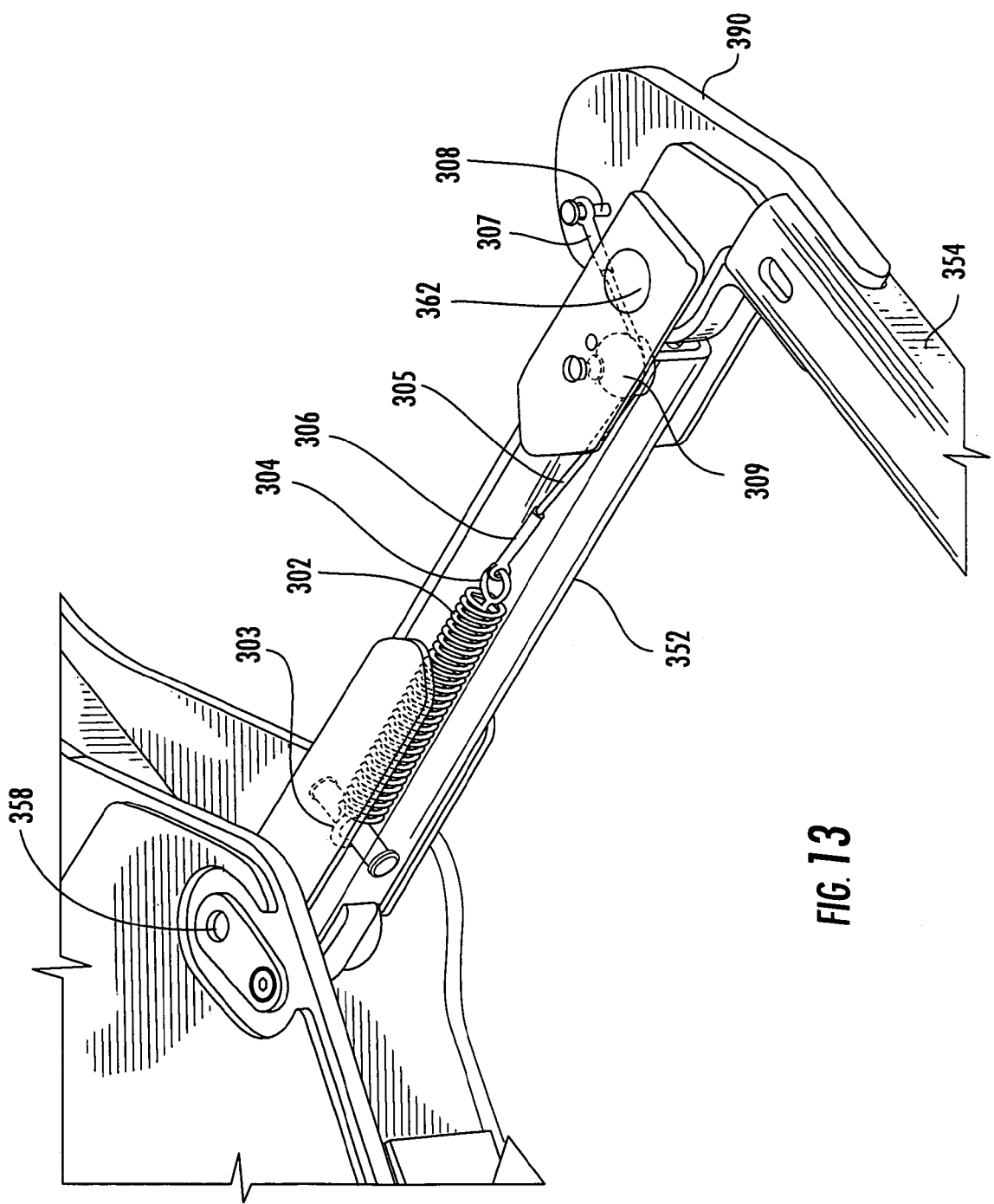
FIG. 13 is a partial perspective view of the wheel grid shown in FIG. 12 showing a wheel retainer system in a use position.

FIG. 13 shows the wheel retainer system 330 in the use position wherein the spring 302 is at least partially unloaded. According to the embodiment illustrated, a linking member, shown as a cable 305 is provided between the second end 304 of the spring 302 and the second member 354. In particular, the cable 305 is shown having a first end 306 secured to the second end 304 of the spring 302 and a second end 307 secured to a pin 308 provided on the cam 390. Movement of the cable 305 is at least partially controlled by a guide 309 (e.g., bearing, roller, pulley, etc.) mounted on the first member 352. According to various alternative embodiments, the cable 305 may be eliminated or may be integrally formed with the spring 302.

Figure 14:
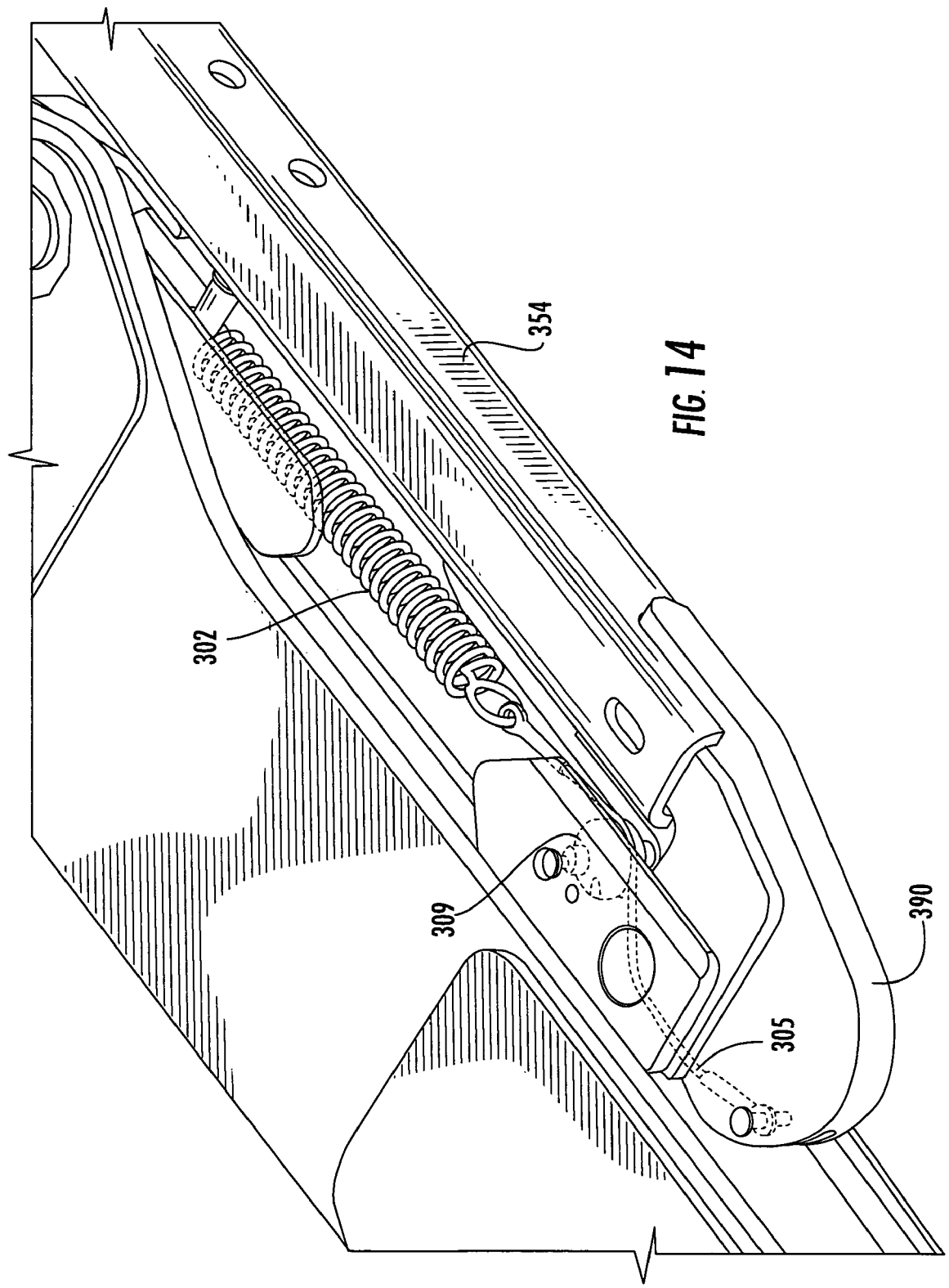
FIG. 14 is a partial perspective view of the wheel grid shown in FIG. 12 showing the wheel retainer system in a stowed position.

FIG. 14 shows the wheel retainer system 350 in the stowed position wherein the spring 302 is at least partially loaded. According to the embodiment illustrated, in the stowed position, the spring 302 is stretched between the first end 303 and the second end 304 to create tension in the spring 302. In the stowed position, the configuration of the cam 390 acting against the cross bar member 322 prevents the spring 302 from releasing.

To deploy the wheel retainer system 350, the actuator device 364 applies a force on the first member 352 which causes the first member 352 to rotate counterclockwise about the first axis 358. When the camming surface 392 begins to move away from the cross bar member 322, the spring 302 urges the second member 354 to rotate clockwise about the second axis 362. Once the camming surface 392 is fully clear of the cross bar member 322, the spring 302 will urge the second member 354 into a fully extended position wherein the second member 354 is substantially perpendicular to the first member 352. A detent or other locking device may be provided to maintain the second member 354 in a desired use position relative to the first member 352.

It is important to note that the construction and arrangement of the wheel lift systems, wheel grids, or wheel retainer systems as shown in the various exemplary embodiments are illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, elements shown as multiple parts may be integrally formed, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. A wheel grid comprising:
a cross bar;
a first wheel retainer coupled to the cross bar, and comprising a first arm supported at the cross bar and configured to move between a stowed position and a use position, a second arm movably coupled to the first arm and configured to move between a stowed position and a use position, and a first cam configured to engage the cross bar as the first arm moves from the use position to the stowed position for moving the second arm from the use position to the stowed position; and
a second wheel retainer coupled to the cross bar and comprising a third arm supported at the cross bar and configured to move between a stowed position and a use position, a fourth arm movably coupled to the third arm and configured to move between a stowed position and a use position, and a second cam configured to engage the cross bar as the third arm moves from the use position to the stowed position for moving the fourth arm from the use position to the stowed position.

2. The wheel grid of claim 1, wherein the first arm is substantially parallel with the cross bar in the stowed position and substantially perpendicular to the cross bar in the use position.

3. The wheel grid of claim 2, wherein the second arm is substantially parallel with the first arm when in the stowed position.

4. The wheel grid of claim 3, wherein the second arm is substantially perpendicular to the first arm when in the use position.

5. The wheel grid of claim 1, further comprising a powered actuator coupled to the first arm for moving the first arm between the use position to the stowed position.

6. The wheel grid of claim 5, wherein the powered actuator comprises at least one hydraulic cylinder disposed within the cross bar.

7. The wheel grid of claim 5, further comprising an unfolding mechanism for moving the second arm from the stowed position to the use position in response to the powered actuator moving the first arm from the stowed position to the use position.

8. The wheel grid of claim 7, wherein the unfolding mechanism comprises a latch coupled to the cross bar and a projection extending from one of the first cam and the second arm, the projection is configured to engage the latch as the first arm moves from the stowed position to the use position.

9. The wheel grid of claim 8, wherein the latch is pivotally coupled to the cross bar and configured to swing upwardly when engaged by the projection as the first arm moves from the use position to the stowed position.

10. The wheel grid of claim 8, wherein the latch includes a lip configured to engage the projection.

11. The wheel grid of claim 7, wherein the unfolding mechanism comprises a biasing element having a first end coupled to the first arm and a second end coupled to one of the first cam and the second arm.

12. The wheel grid of claim 11, wherein the biasing element begins to urge the second arm into the use position when the first arm begins to move into the use position.

13. The wheel grid of claim 12, wherein the biasing element is a tension spring configured to be at least partially loaded when the second arm is in the stowed position and at least partially unloaded when the second arm is in the use position.

14. The wheel grid of claim 11, wherein the biasing element is at least partially disposed within the first arm.

15. A wheel lift system for use with a transporter vehicle, the wheel lift system comprising:
a boom assembly;
a cross bar supported at a distal end of the boom assembly;
a first wheel retainer coupled to the cross bar, and comprising a first arm movably coupled to the cross bar and configured to move between a retracted stowed position and an extended use position; a second arm pivotally coupled to the first arm and configured to move between a retracted stowed position and an extended use position and a first cam configured to engage the cross bar for moving the second arm from the use position to the stowed position; and
a second wheel retainer coupled to the cross bar and comprising a third arm movably coupled to the cross bar and configured to move between a retracted stowed position and an extended use position; a fourth arm pivotally coupled to the third arm and configured to move between a retracted stowed position and an extended use position, and a second cam configured to engage the cross bar for moving the fourth arm from the use position to the stowed position.

16. The wheel lift system of claim 15, wherein the first cam is coupled to the second arm and the second cam is coupled to the fourth arm.

17. The wheel lift system of claim 15, wherein the first cam is integrally formed with the second arm and the second cam is integrally formed with the fourth arm.

18. A transporter vehicle comprising:
a movable chassis;
an extensible boom assembly supported at a rear portion of the chassis;
a cross bar supported at a distal end of the extensible boom assembly;
a first wheel retainer coupled to the cross bar, and comprising a first arm pivotally coupled to the cross bar and configured to move between a stowed position and a use position, a second arm pivotally coupled to the first arm and configured to move between a stowed position and a use position, a first powered actuator configured to move the first arm between the stowed position to the use position and a first cam configured to engage the cross bar as the first arm moves from the use position to the stowed position for moving the second arm from the use position to the stowed position; and
a second wheel retainer coupled to the cross bar and comprising a third arm pivotally coupled to the cross bar and configured to move between a stowed position and a use position, a fourth arm pivotally coupled to the third arm and configured to move between a stowed position and a use position, a second powered actuator configured to move the third arm between the stowed position to the use position and a second cam configured to engage the cross bar as the third arm moves from the use position to the stowed position for moving the fourth arm from the use position to the stowed position.

19. The vehicle of claim 18, further comprising an unfolding mechanism configured to move the second arm from the stowed position to the use position in response to the first powered actuator moving the first arm and to move the fourth arm from the stowed position to the use position in response to the second powered actuator moving the third arm.

20. The vehicle of claim 19, wherein the unfolding mechanism comprises a biasing element coupled between the first arm and the second arm and at least part concealed within the first arm.

21. A wheel grid comprising:
a cross bar;
a first wheel retainer and a second wheel retainer coupled to the cross bar, the first and second wheel retainers each comprising a first arm supported at the cross bar and configured to move between a stowed position and a use position and a second arm movably coupled to its respective first arm and configured to move between a stowed position and a use position; and
an unfolding mechanism configured to move the second arms from the stowed position to the use position in response to the first arms moving from the stowed position to the use position, the unfolding mechanism comprising a latch supported at the cross bar and a projection supported at each of the first wheel retainer and the second wheel retainer for engaging the latch.

22. The wheel grid of claim 21, wherein the latch comprises a common latch member configured to be engaged by both the projection associated with the first wheel retainer and the projection associated with the second wheel retainer, the common latch member being pivotally coupled to the cross bar and configured to swing upwardly when the first arms move from the use position to the stowed position.

23. The wheel grid of claim 21, wherein each of the first wheel retainer and the second wheel retainer further comprises a cam supported at its respective second arm and configured to move its respective second arm from the use position to the stowed position by engaging the cross bar.

24. A wheel grid comprising:
a cross bar;
a first wheel retainer coupled to the cross bar, and comprising a first arm supported at the cross bar and configured to move between a stowed position and a use position, a second arm movably coupled to the first arm and configured to move between a stowed position and a use position and a first unfolding mechanism configured to move the second arm and from the stowed position to the use position in response to the first arm moving from the stowed position to the use position, the first unfolding mechanism comprising a first biasing element having a first end coupled to the first arm and a second end coupled to the second arm; and
a second wheel retainer coupled to the cross bar and comprising a third arm supported at the cross bar and configured to move between a stowed position and a use position, a fourth arm movably coupled to the third arm and configured to move between a stowed position and a use position; and a second unfolding mechanism configured to move the fourth arm from the stowed position to the use position in response to the third arm moving from the stowed position to the use position, the second unfolding mechanism comprising a second biasing element having first end coupled to the third arm and a second end coupled to the fourth arm.

25. The wheel grid of claim 24, wherein the first biasing element and the second biasing element are tension springs, the first biasing element being configured to be at least partially loaded when the second arm is in the stowed position and at least partially unloaded when the second arm is in the use position, the second biasing element being configured to be at least partially loaded when the fourth arm is in the stowed position and at least partially unloaded when the fourth arm is in the use position.

26. The wheel grid of claim 25, wherein the first biasing element is at least partially disposed within the first arm and the second biasing element is at least partially disposed within the third arm.

* * * * *